United States Patent [19]

Schweizer et al.

[11] Patent Number: 5,087,811
[45] Date of Patent: Feb. 11, 1992

[54] OPTICAL TRAIN FOR MEASURING ANGLE OR POSITION WITH TRANSMISSION BY INTRINSICALLY LINEAR AND REFERENCED OPTICAL FIBERS USING ONE OR MORE LIGHT SOURCES

[75] Inventors: Pascal Schweizer, Nice, France; Antoine Neveux, Monaco, Monaco; Louis Macon, Golfe Juan, France

[73] Assignee: Spectec S.A., Nice, France

[21] Appl. No.: 492,564

[22] Filed: Mar. 13, 1990

[30] Foreign Application Priority Data

Mar. 13, 1989 [FR] France ................ 89 03370

[51] Int. Cl.[5] .................. H01J 5/16; G01J 3/50
[52] U.S. Cl. ................... 250/227.21; 250/227.23; 250/226; 250/231.13
[58] Field of Search ........... 250/227.23, 227.21, 250/227.18, 231.1, 231.18, 237 R, 226, 231.13, 211 K; 356/405, 406, 416, 418, 419, 420, 375, 373

[56] References Cited

U.S. PATENT DOCUMENTS

| | | | |
|---|---|---|---|
| 4,281,245 | 7/1981 | Brogardh et al. | 250/227.23 |
| 4,356,397 | 10/1982 | Lenderking et al. | 250/231.13 |
| 4,560,272 | 12/1985 | Harris | 356/138 |
| 4,587,513 | 5/1986 | Burrowes et al. | 250/231.13 |
| 4,652,747 | 3/1987 | Ellis | 250/227.23 |
| 4,743,119 | 5/1988 | Ida | 250/227.23 |
| 4,761,551 | 8/1988 | Edwards et al. | 250/227.23 |
| 4,891,510 | 1/1990 | Jones et al. | 250/227.23 |
| 4,947,036 | 8/1990 | Pokorski et al. | 250/231.1 |

FOREIGN PATENT DOCUMENTS

| | | |
|---|---|---|
| 0095273 | 11/1983 | European Pat. Off. . |
| 0140574 | 5/1985 | European Pat. Off. . |
| 2427584 | 12/1979 | France . |
| 58-156802 | 9/1983 | Japan . |
| 0085318 | 5/1985 | Japan ............ 250/227.23 |

OTHER PUBLICATIONS

"Fiber-Optic Angular Sensor with Interleaved Channel Spectra", *Optics Letter*, vol. 11, No. 8, Aug. 1986, by Ph. Dabkiewicz et al., pp. 543–545.

Schweizer et al., "Intrinsically Linear Wavelength Referenced Fiber Optic Absolute Angular Displacement Sensor", Proc. of Optical Fiber Congress, No. 7, 12/6, 1990.

*Primary Examiner*—David C. Nelms
*Assistant Examiner*—Michael Messinger
*Attorney, Agent, or Firm*—Young & Thompson

[57] ABSTRACT

A referenced optical chain for measuring angle or position, using transmission by optical fibers. The device comprises a measuring head (29) receiving two light waves transported by a supply optical fiber (28); at the measuring head (29), the incident light beams are collimated (33) then intercepted by an assembly comprising a fixed diaphragm (34) and a movable filter (35) intercepting one of the two light waves; this assembly constitutes the measuring system itself; the resultant light signals are then refocussed and coupled to an optical return fiber which transports the signals toward a photodetector. The measurement is linear and the measuring chain is referenced in all of the embodiments of the invention. The device may be used in any application which requires a measurement of angle or position.

8 Claims, 6 Drawing Sheets

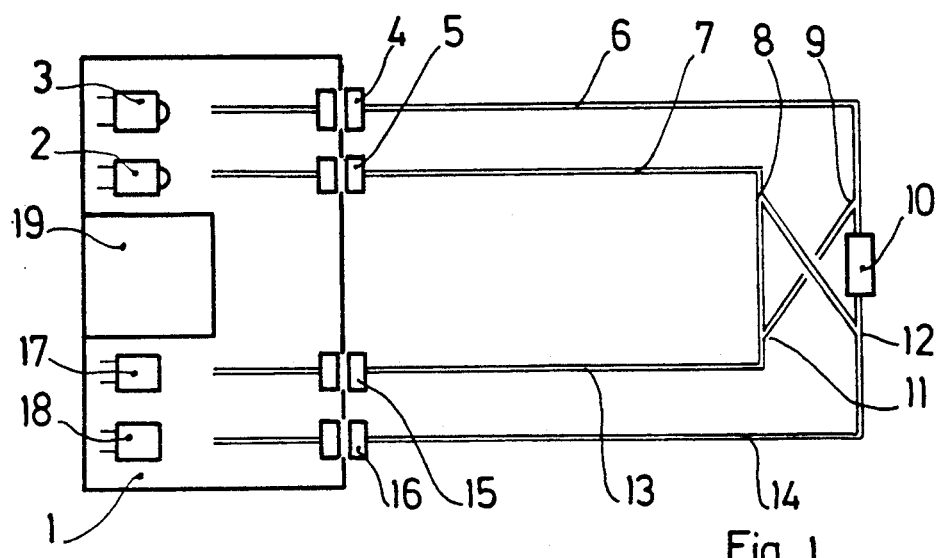
Fig_1
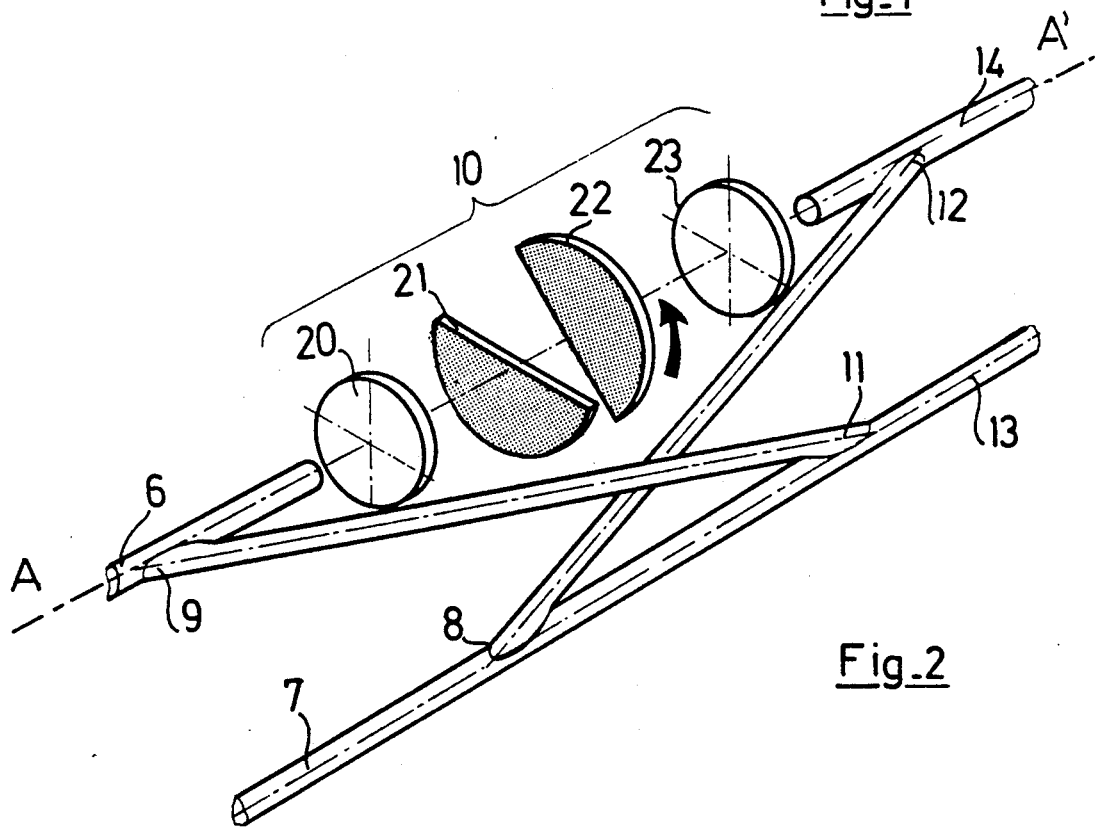
Fig_2

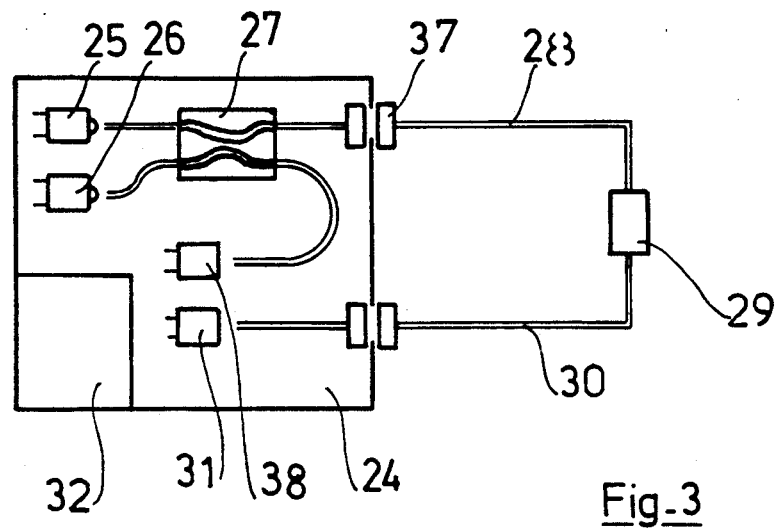
Fig_3
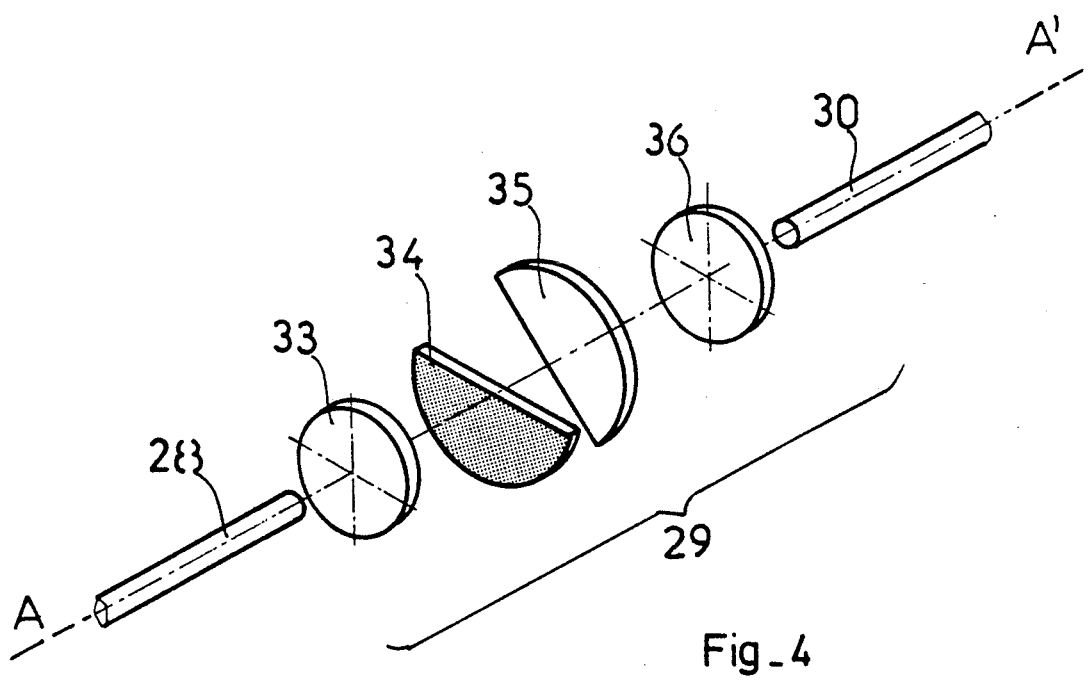
Fig_4

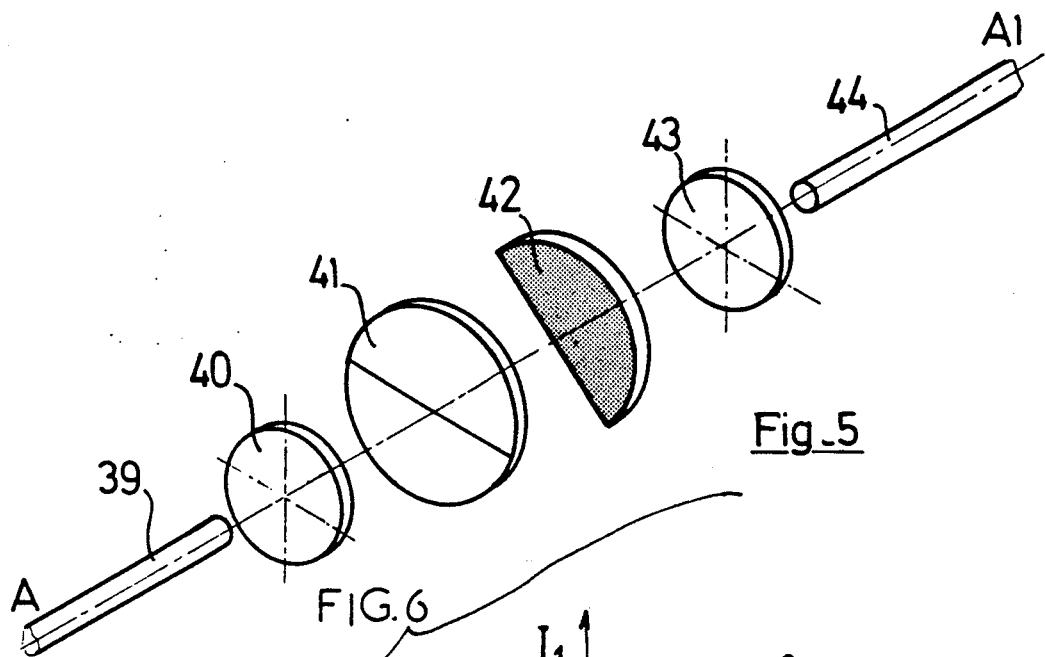
Fig_5
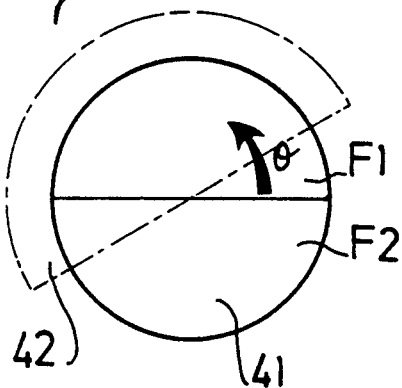
FIG.6
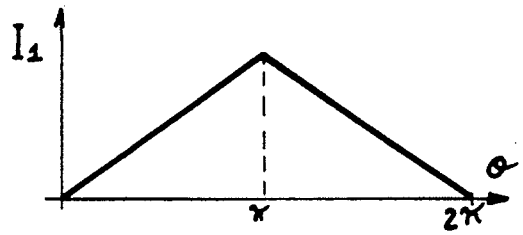
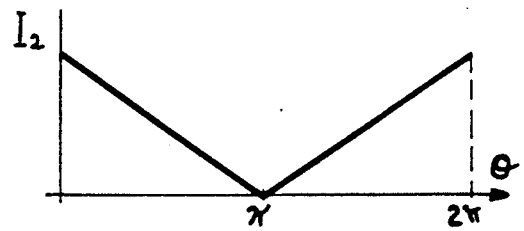
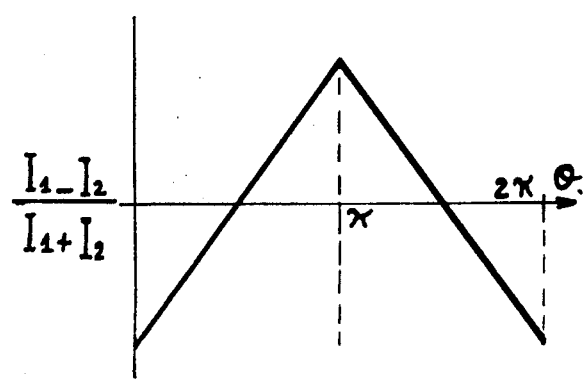

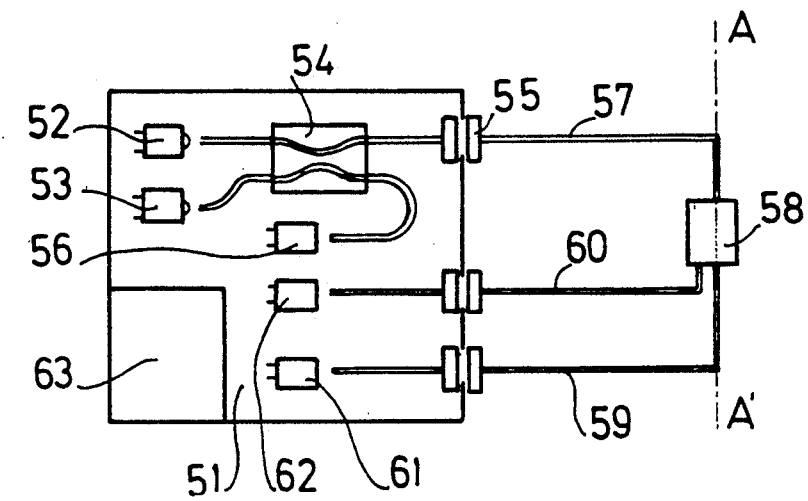
Fig_9
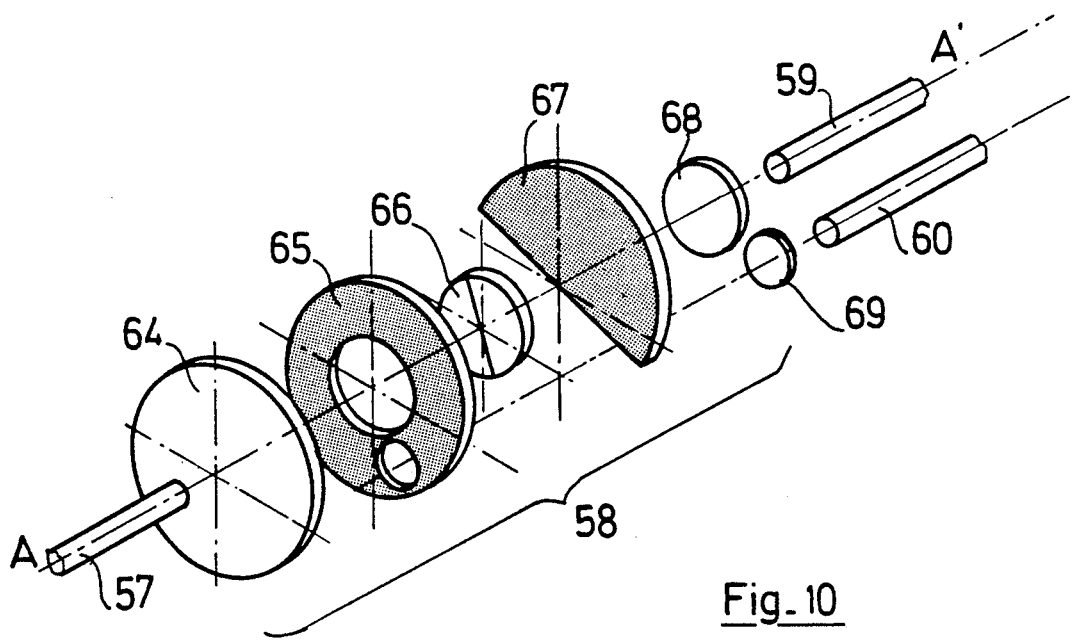
Fig_10

OPTICAL TRAIN FOR MEASURING ANGLE OR POSITION WITH TRANSMISSION BY INTRINSICALLY LINEAR AND REFERENCED OPTICAL FIBERS USING ONE OR MORE LIGHT SOURCES

FIELD OF THE INVENTION

The present invention has as an object a referenced chain for measuring angle or position, comprising only optical elements (light transport by optical fiber to an optical measuring head and return transport of information by optical fiber) and having a fixed character, that is to say not operating according to an incremental process.

BACKGROUND OF THE INVENTION

In known devices of this type, using properties of polarization of light, the detected signal (light intensity) is not proportional to the measured width (angle or position).

It is necessary to include a signal treatment step in the chain for measuring and amplifying from the system.

Other known devices are supposedly intrinsically linear.

Such is the case for optical sensors with digital coding and fiber transmission, which comprise a great number of optical fibers associated at various positions of the sensor; their resolution is naturally limited by the number of fibers in position.

Another known optical device for angle measurement uses absorption of a light ray through an absorbing filter having the shape of a crown of which the density depends linearly on the angular position; this device also has an optical reference system for the measuring chain based on the optical Wheatstone bridge technique (which is a publicly known technique, see, for example "une technique d'équilibrage dans les capteurs à fibre optique à intensité modulée", B. Culshaw et al., 2ème conférence international sur les fibres optiques, 1984, p. 117, VDE-VERLAG GmbH Berlin). This device has a significant defect in that the light beam does not coincide with the axis of rotation of the filter. An important disadvantage thereby results. In addition, it uses fiber optic couplers, connecting four optical fibers, which become unstable in difficult environmental conditions (vibrations, temperature variations...). These instabilities relate to variations of the overall distribution of light energy in the optical fibers. Finally, the level of losses in this sensor has led its inventors to use laser diodes instead of optical sources with a larger spectrum, with the result that laser granularity is produced at the level of the absorbing filter which strongly reduces its resolution and the reproducibility of the measurements.

THE PRIOR ART

The state of the art may also be defined by the following patents:

French patent No. 2,589,233: the coder comprises: an element having a band which is completely transparent with respect to two wavelengths L1 and L2 but varies as a function of the angular or linear distance for a third wavelength comprised between L1 and L2; light emitting means emitting three light beams at three wavelengths; a first optical coupler mixing the beams; means for bidirectional optical transmission with optical fiber(s); a second optical coupler dividing into three beams the light exiting from the means after reflecting in the optical element and passage through the band; three sensitive detectors; and an integrated electronic unit determining the relation between the average responses.

French patent No. 2,589,234: position coder whose element bearing the code comprises at least one band whose transparency varies for a given wavelength with the sine and/or cosine of the angular or linear distance, with respect to an origin, and which comprises an opto-electronic emitter, an opto-electronic detector, a treating unit, a bidirectional optical coupler, a bidirectional optical beam mixer-divider, two micro-mirrors pivotable between an active position for reflecting light on the band and an inactive position, an independent energy supply source and an electronic unit for treating signals which calculates the response of the detector when a micro-mirror is in active position and when the two micro-mirrors are in active position, the response of the detector when the two micro-mirrors are in inactive position being derived from the other responses.

OPTIC LETTERS No. 8, Aug. 11, 1986, pages 543-545, New York, N.Y., U.S.A.: this document describes a device whose object is different from that of the present invention. There is no optical element for revolving about the optical axis A—A', and no filtering or shielding element having a surface along the optical axis A—A'.

European Appln. No. 0140,574: optical method for measuring displacements with a detector which must be used in a method comprising a light conductor (5) and a concave reflective element (9) positioned such that one end (7) of the light conductor is at the center of the curvature of the reflective element. The reflective element (9) has several zones, having different coefficients of light reflection, interiorly of two bands of different wavelength. An interposition element (51) is interposed between the end (7) and the reflective element (9), the interposition element having light transmission properties which vary in the space through the interposition element, in a direction transverse to the optical axis of the element (9). The interposition element (51) and the reflective element (9) are disposed such that they may be displaced, relative to one another, in a direction transverse to the optical axis of the element (9).

U.S. Pat. No. 4,560,272: optical detector comprising an apparatus for directing the angular movement of a remote body situated about three perpendicular axes starting from a single observation point. A compact and entirely passive target is adapted to be attached to the body, whose angular movement must be detected. The target reflects light rays which represent the functions of highest, lowest and rotation measurement. The reflected rays are optically detected and reduced to their components along the uppermost, lowermost and rotation axes, which are visually represented through a single viewfinder.

This device does not use optical fibers.

Japanese Appln. No. 58-156802: this device does not permit measuring angle. It uses the principle of shielding and not filtering. There is no measurement of rotation.

SUMMARY OF THE INVENTION

The device for measuring angle according to the invention is absolute, that is to say non-incremental, intrinsically linear and referenced. It uses only optical components, not only for the measuring head which constitutes the optical sensor proper, but also for the transport of light waves across the measuring head and light signals resulting from the measurement. The intrinsic linearity of the measurement is assured by the same principle for the measurement and the symmetry properties of the light beams at the level of the measuring head.

Different means of referencing the measuring chain are practiced according to the selected embodiment for execution of the invention.

The operation of the device according to the invention is independent of the global distribution of energy of the light waves interiorly of the optical fibers; the device thus possesses a very great stability with respect to exterior perturbations exerted on the measuring chain (vibrations, temperature variations . . . ).

In addition, this device containing only optical elements is naturally protected against electro-magnetic disturbances.

The use of non-coherent light sources confers to it an excellent resolution, thereby avoiding the appearance of laser granularity at the measuring head.

Finally, whatever be the embodiment of the invention, the measuring head has very small overall dimensions, which gives it considerable advantage relative to the systems described above.

The device according to whichever embodiment of the invention comprises notably a measuring head receiving one or several light waves issued from incoherent optical sources (wide spectra centered about a wavelength) and transported by a supply optical fiber having a symmetry of revolution. In the measuring head, the incident light beams are collimated then intercepted by an assembly of diaphragms and/or filters (absorbing or interferential), fixed and movable, which constitute the measuring system itself. The resulting light signals are thus refocussed and coupled at a return optical fiber which transports the signals toward an intensity detector. The said device has a characteristic axis which is the axis of symmetry of the inlet and outlet optics; the diaphragms and/or filters are fixed, or turn about this axis.

According to a still more general conception of the invention, there will first be distinguished fixed optical elements and optical elements having symmetry of revolution about a common optical axis defining the axis of the measuring head and intended to shape the light waves exiting from the supply fiber so as to permit measuring followed by recoupling, total or partial, to the return optical fiber for the resulting light signals and, second, an assembly of shielding and/or filtering elements, fixed and movable, each having an axis of symmetry passing through the axis of the system and adapted to be turned, as the case may be, about this axis and intended to effect the measurement.

First, a single light wave is directed toward the measuring head and the measuring system is constituted of two diaphragms of which one is fixed and the other is adapted to turn about the axis of the optical head.

A referencing means of the measuring chain is assured by the operation of an optical Wheatstone bridge.

First, two light waves of different wavelength are introduced into the supply fiber and second the measuring system is constituted of a selective filter completely intercepting one of the two wavelengths and allowing the other to pass, and a diaphragm or a second filter.

First, two light waves of different wavelength are introduced into the supply fiber and second the measuring system is constituted of a surface formed of two selective half-circular filters followed by a diaphragm or a second filter; each element constituting the filtering surface allowing one of the two light waves to pass completely, and intercepting the other.

First, three light waves of different wavelength are introduced into the supply fiber and second the measuring system is constituted of a surface, fixed or turning, formed of three selective filters blocking one or several of the incident light waves and followed or preceded by a fixed or turning filter or diaphragm.

First, the measuring head has a principal optical path and a secondary optical path off-center with respect to the principal path permitting a measurement intended to discern the angular sector of 180° extent in which the angle measurement is effected, and second, two return optical fibers assure the transfer of the various signals resulting from these measurements.

The various optical elements which permit effecting the measurement may have geometric and/or structural characteristics adapted to minimize the effects of diffraction of the light waves at their boundaries.

A means for controlling the intensities emitted by the light sources, at a constant level, is employed.

A mechanical demultiplication means, connected to the axis of rotation of the movable diaphragm of the measuring head, allows a greater range of angular measurement.

A mechanical device is adapted to the measuring head permitting to transform a rectilinear movement into a rotational movement.

The light rays acted upon by the measuring system have a perfect symmetry of revolution, resulting from the cylindrical symmetry of the fiber, the quality of the extremity of the fiber and the coincidence of the axis of the beam emerging from the supply fiber and the axis of the measuring head.

It will be understood that in any of the embodiments of the invention, coherent optical sources could be employed in place of wide spectrum sources.

Whatever be the embodiment of the invention (number of light waves introduced, configuration of the diaphragms and filters interiorly of these latter), it is possible to transport via the supply optical fiber the signals resulting from the measurement; concurrently, fixed or movable optical elements, intended to reflect all or part of the incident light waves, are situated interiorly of the measuring head and are adapted, if desired, to participate directly in the measuring process.

Regardless of the embodiment of the invention (number of introduced light waves, configuration of the diaphragms and filters interiorly of these latter), it is possible to situate the return optical fiber alongside the supply optical fiber such that the ends of the supply optical fiber and the return optical fiber be situated in the focal plane of the fixed optical system having a symmetry of revolution intended to shape the light beams, and symmetrically with respect to the axis of symmetry of the optics; concurrently, fixed or movable optical elements, intended to reflect all or part of the incident light waves, are situated interiorly of the measuring head and are adapted, if desired, to participate directly in the measuring process.

In the course of this specification are described in a non-exhaustive manner and purely by way of example, several embodiments of the present invention.

The device according to a first embodiment of the invention comprises a measuring head receiving a single non-coherent light wave issuing from an optical source having a wide spectrum centered about a given wavelength and transported by a supply optical fiber.

At the measuring head, the incident light beam is collimated, then intercepted by an assembly of two diaphragms, movable and fixed, which constitute the measuring system itself. The resulting light signal is then refocussed and coupled at an exit optical fiber which transports the signal toward an intensity detector.

The measuring system itself is constituted of two half-planar diaphragms whose edges pass through the axis of the system. The first diaphragm is fixed and intercepts half of the incident collimated light beam. It is followed by a movable diaphragm, adapted to turn about this axis and which intercepts a light energy proportional to the angle at which it is turned. The measuring range of this device is thus 180°, with a resolution and a precision which depend only upon the quality of the mechanical device which guides the rotation of the movable diaphragm. The symmetry of revolution of the light beam and the same principle of the measurement permit avoiding problems associated with the global distribution interiorly of the fibers and assure an intrinsically linear measurement of the angle to which the spindle driving the movable diaphragm is turned.

Finally, the axis of the light beam being the same as the axis of the system, the assembly is compact and adapted to a high degree of integration.

Possible problems of instability due to diffraction phenomena by the edges of the diaphragms and associated with fluctuations of the global distribution interiorly of the supply fiber may be compensated by machining the edges of the diaphragms as is shown for example in the results related in: "Réduction des erreurs de diffraction en radiométrie au moyen d'ouvertures dentelées; L. P. BOIVIN; Optical appliquée Vol. 17, No. 20; p. 3323". Other techniques for correcting diffraction diagrams may be applied, such as the manufacture of diaphragms of which the useful border is not completely opaque but has a variable absorption.

According to a preferred mode of execution of this first embodiment of the invention, the measuring chain of the device is referenced by an optical Wheatstone bridge.

According to a first variation of this first embodiment of the invention, the rotation mechanism of the movable diaphragm is demultiplied and permits achieving a greater range of measurement.

According to a second variation of this first embodiment of the invention, the rotation mechanism of the movable diaphragm is coupled to a rack associated with a rectilinear displacement and permits achieving a measurement of position in an intrinsically linear manner.

According to a second embodiment of the invention, two non-coherent light waves of different wavelengths $\lambda_1$ and $\lambda_2$ are introduced into an optical fiber which guides them to the measuring head. The measuring system itself differs from the system described according to the first embodiment of the present invention, in that one of the two diaphragms is replaced by a turning blade which filters exclusively only one of the two light waves. According to the preferred mode of execution, the movable element which permits performing the measurement will be the blade or the diaphragm and could precede or follow the fixed element. According to the preferred mode of execution, the filtering blade will be either a filter completely absorbing one of the two light waves, or an interferential filter totally reflecting one of the two light waves.

The axial symmetry of the two light beams is assured notably by the cylindrical symmetry of the supply fiber and the geometry of the measuring head. This property of axial symmetry of the two light beams and the same principle of the measurement means that the two light waves may have different overall distributions at the measuring head, without the measurement itself being affected. It thus results that the intrinsic linearity of the measurement is assured. Finally, it has now been demonstrated (see "Etude des caractéristiques de transmission fonctions de la longeueur d'onde, dans les systèmes mettant en oeuvre des capteurs à fibres optiques:, R. JONES, K. W. JONES, Sciences Optiques, 27 No. 1, (1988), pp. 23-29) that the line losses for two light waves of neighboring frequencies are equivalent to 0.01% at best. The device according to this second version of the invention is thus termed referenced, since half of the intensity of one of the two light waves is always transmitted. The ratio of the transmitted intensities is thus rigorously proportional to the angle between the diaphragm and the filter.

According to a first variation of this second embodiment of the invention, the rotation mechanism of the movable diaphragm is demultiplied and permits achieving a greater range of measurement.

According to a second variation of this second embodiment of the invention, the rotation mechanism of the movable diaphragm is coupled to a rack associated with a rectilinear displacement and permits achieving a measurement of position in an intrinsically linear manner.

According to a third embodiment of the invention, two non-coherent light waves of different wavelengths $\lambda_1$ and $\lambda_2$ are introduced into an optical fiber which guides them to the measuring head. The measuring system itself is constituted of a diaphragm of two juxtaposed half-circular selective filters completely intercepting one of the two light waves and allowing the other to pass.

The discussion concerning the second embodiment of the invention, concerning the linearity of the measurement and its referencing, applies also for this third embodiment of the invention; in this case, it is proper to generate the ratio of the difference of the intensities to their sum, and there is thus obtained a linear scale passing from $-1$ to $+1$, proportionally to the angle at which the diaphragm is turned over a range of 180°.

According to a first variation of this third embodiment of the invention, the rotation mechanism of the movable diaphragm is demultiplied and permits achieving a greater measurement range.

According to a second variation of this third embodiment of the invention, the rotation mechanism of the movable diaphragm is coupled to a rack associated with a rectilinear displacement and permits achieving a position measurement in an intrinsically linear manner.

According to a fourth embodiment of the invention, three non-coherent light waves of different wavelengths $\lambda_1$, $\lambda_2$ and $\lambda_3$ are introduced into an optical fiber which guides them to the measuring head. The measuring system itself is constituted of a fixed or turning surface of absorbing or interferential filters blocking one or several of the preceding light waves, followed by a fixed or turning filter or diaphragm.

The use of three wavelengths and a measuring head of this type permits effecting an angle measurement over a 360° range without ambiguity. Numerous conceptions of the measuring head are possible which employ sets of filters and diaphragms which are fixed or adapted to turn about the axis of the measuring head.

According to a variation of this fourth embodiment of the invention, the rotation mechanism of the movable filter is demultiplied and permits achieving a greater measurement range.

According to another variation of this fourth embodiment of the invention, the rotation mechanism of the movable diaphragm is coupled to a rack associated with a rectilinear displacement and permits achieving a position measurement in an intrinsically linear manner.

According to a fifth embodiment of the invention, two non-coherent light waves of different wavelengths $\lambda_1$ and $\lambda_2$ are introduced into an optical fiber which guides them to the measuring head. A collimation optical element is followed by a diaphragm having, first, a circular opening centered on the axis of the measuring head and, second, a smaller off-center circular opening. Two optical fibers are provided for return, and correspondingly two focussing optical systems; the first acts in the axis of the measuring head and receives only the light selected by the principal opening of the inlet diaphragm and the diaphragms and filtering elements of the measuring head; the other optical system receives the light issuing from the off-center opening of the diaphragm. The measuring system itself is constituted of two juxtaposed half-circular filters, opaque to one or the other of the two wavelengths, followed or preceded by a diaphragm of which the edge passes precisely through the axis of the measuring head and which constitutes the turning element of the system. The ratio of the difference of the transmitted intensities to their sum on the central path of this measuring head permits achieving a measurement range of 360°, in a referenced manner. The transmission or non-transmission, by the turning diaphragm, of light issuing from the lateral opening of the diaphragm of the inlet optical element permits identifying the angular region (0°-180° or 180°-360°) in which the measurement is effected, which remains intrinsically linear.

According to a variation of this fifth embodiment of the invention, the rotation mechanism of the movable filter is demultiplied and permits achieving a greater measurement range.

According to another variation of this fifth embodiment of the invention, the rotation mechanism of the movable diaphragm is coupled to a rack associated with a rectilinear displacement and permits achieving a position measurement in an intrinsically linear manner.

According to a sixth embodiment of the invention, the optical measuring head operates by reflection. The extremities of the supply and return optical fibers are situated in the focal plane of the collimation optical system and symmetrically with respect to the axis of symmetry A—A' of the measuring head. The incident light beam is collimated, then intercepted by a set of diaphragms and/or movable and fixed filters which constitute the measuring system itself. The resultant light beam is next reflected by a fixed or movable planar mirror position normal to the axis of symmetry A—A', then focussed by the optical system of the return fiber. According to a first variation of this embodiment, the measuring head receives only a single non-coherent light wave, the measuring system itself is constituted of two semi-planar diaphragms whose edges pass through the axis of symmetry A—A'. The first diaphragm is fixed and intercepts half of the incident collimated light beam, and is followed by a movable diaphragm, adapted to turn about the axis A—A, and which intercepts a light energy proportional to the angle to which it is turned. According to a second variation of this embodiment, the optical measuring chain is referenced by an optical Wheatstone bridge. According to a third variation of this embodiment, two non-coherent light waves of different wavelengths $\lambda_1$ and $\lambda_2$ are introduced into the supply optical fiber. The measuring head comprises a planar interferential filter situated upstream of the two diaphragms, which constitute the measuring system itself. This planar interferential filter is positioned normal to the axis of symmetry A—A', and reflects the light wave $\lambda_1$, and transmits the light wave $\lambda_2$. The light wave $\lambda_1$ reflects through the filter and is focussed by the optical system in the return optical fiber, and the quantity of light reflected by the filter is independent of the position of the measuring system. The light wave $\lambda_2$ is modulated by the measuring system composed of two fixed and movable diaphragms, the optical beam resulting from the light wave $\lambda_2$ is next reflected by the planar mirror, then again traverses the interferential filter prior to being focussed by the optical system in the return optical fiber. The measuring chain is referenced by generating the ratio of the intensities of the two light waves transmitted by the return fiber.

BRIEF DESCRIPTION OF THE DRAWINGS

The accompanying drawings are given by way of explanatory and non-limiting example. They show a preferred embodiment according to the invention. They will permit a ready understanding of the invention.

Five sheets of figures are attached.

FIG. 1 shows an optical chain for measuring angle according to the first embodiment of the present invention, notably comprising a means for referencing the measuring chain with an optical Wheatstone bridge.

FIG. 2 is an exploded view of the angle measuring head, that is of the angular optical detector itself, according to the first embodiment of the invention.

FIG. 3 shows an optical chain for measuring angle according to the second embodiment of the present invention and in which the intensities of the light sources are maintained at constant levels by control means.

FIG. 4 is an exploded view of the angular measuring head according to the second embodiment of the present invention.

FIG. 5 is an exploded view of the angular measuring head according to a preferred mode of execution of the third embodiment of the present invention.

FIG. 6 describes the operation of the measuring head according to a preferred mode of execution of the third embodiment of the invention. It comprises outlines of the intensities detected at the two wavelengths $\lambda_1$ and $\lambda_2$ in question, as a function of the angle between the diaphragm and the surface composed of the two filters F1, F2; each filter allows one of the two light waves to pass, and intercepts the other.

FIG. 9 shows an optical chain for measuring angle according to the fifth embodiment of the present invention.

FIG. 10 is an exploded view of the angular measuring head according to a preferred mode of execution of the fifth embodiment of the present invention.

DETAILED DESCRIPTION OF THE PREFERRED EMBODIMENTS

Figure 7:
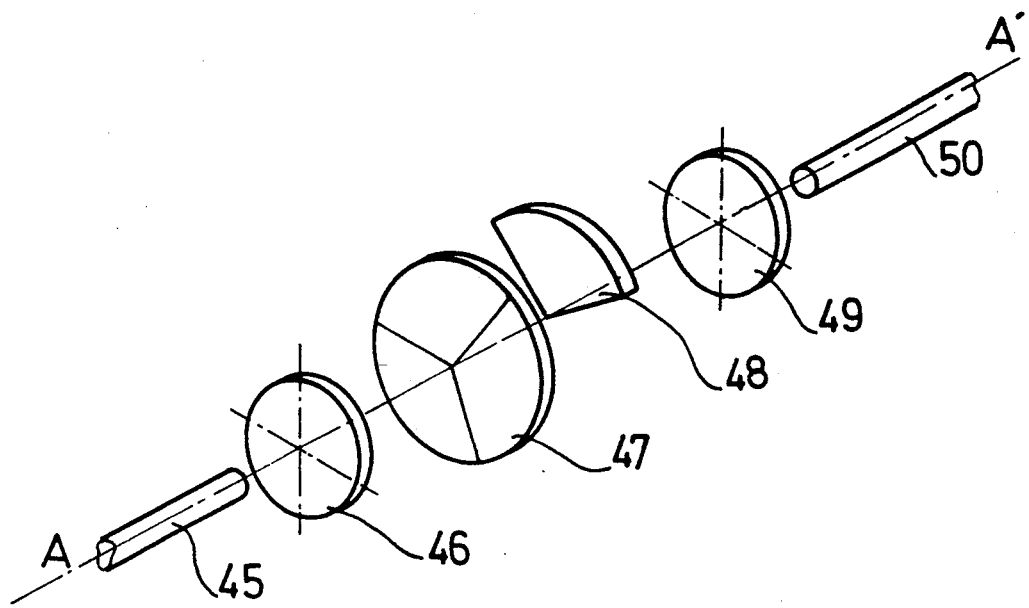
FIG. 7 is an exploded view of the angular measuring head according to a preferred mode of execution of the fourth embodiment of the present invention.

FIG. 1 shows an optical chain for measuring angle according to the first embodiment of the present invention, notably comprising a referencing means for the measuring chain with an optical Wheatstone bridge.

The control cabinet 1 contains two light sources 2 and 3 modulated in intensity at different frequencies $f_1$ and $f_2$.

The connectors 4 and 5 permit coupling the light issuing from 2 and 3 to the supply optical fibers 6 and 7. Each connector may be followed, if desired, by a mixer of modes and an evacuator of non-propagating modes (not shown in FIG. 1).

The fiber couplers 8 and 9 permit directing the light waves issuing from the two sources 2 and 3 toward the measuring head 10 and the couplers 11 and 12 which open onto the fibers 13 and 14. The fibers 13 and 14 are connected to the control cabinet 1 by connectors 15 and 16.

The light waves issuing from the fibers 13 and 14 are detected by photodiodes 17 and 18.

An electronic module 19 permits assuring the modulation of the two light sources 2 and 3 and the treatment of the signals received by the photodiodes 17 and 18.

The measuring head 10, shown in FIG. 2 is constituted of a system 20 which permits collimating the light issuing from the fibers 6 via the coupler 9 and directing the parallel and cylindrically symmetrical beam thus obtained toward a half-planar fixed diaphragm 21 whose edge cuts the light beam at the level of its axis A—A'. The resultant beam encounters another diaphragm 22, of the same type, adapted to turn about the axis A—A'. This turning diaphragm intercepts a fraction of the light energy transmitted by the previous diaphragm, proportional to the angle at which it is turned. Finally, an optical system 23 permits focussing the beam transmitted by the set of the two diaphragms and coupling it to the return fiber 14 via the coupler 12.

The photodiodes 17 and 18 alternatively detect light waves modulated at the frequencies $f_1$ and $f_2$. In these conditions, the transmission of the detecting head is given by:

$$T = (f_1(17) f_2(18))/(f_1(18) f_2(17)) \text{ where } f_1(j)$$

is the light intensity modulated at the frequency $f_1$ and received by the photodiode j.

This transmission is independent of the variations of the sources or receptors and is independent of the line losses over the optical circuit (variations due to connectors or the line length, for example).

FIG. 3 shows an optical chain for measuring angle according to the second embodiment of the present invention. The control cabinet 24 contains two light sources 25 and 26 of different wavelengths.

An X-shaped fiber coupler 27 permits directing the two waves emitted by the two sources 25 and 26 toward the connector 37 or toward the photodiode 38. The connector 37 permits coupling the light issuing from the two sources 25 and 26 to the supply optical fiber 28. The connector 37 may be followed, if desired, by a mixer of modes and an evacuator of non-propagating modes (not shown in FIG. 3).

The optical fiber 28 transports the light waves to the measuring head 29. The measurement signals are next transmitted to the control cabinet 24 by the optical fiber 30. The measurement signals are detected by the photodiode 31.

An electronic module 32 permits synchronizing the alternate emission from the two light sources 25 and 26 and detecting of the corresponding signals by the photodiode 31.

This electronic module 32 also permits controlling the emission power of the diodes 25 and 26 at a constant level, by using signals delivered by the photodiode 38.

The measuring head 29, shown in FIG. 4, is constituted of a system 33 permitting collimating the light issuing from the supply fiber 28 and directing the parallel and cylindrically symmetrical beam thus obtained toward a half-planar fixed diaphragm 34 whose edge cuts the light beam at the level of its axis A—A'. The resulting beam encounters a filter 35 adapted to turn about the axis A—A'. This filter is especially adapted to intercept only one of the two light waves. By alternately measuring the light intensities corresponding to the two wavelengths and by effecting the relation of these latter, there is achieved a linear and referenced measurement of the angular position of a filter 35. Finally, an optical system 36 permits coupling the resultant beam to the return fiber 30.

FIG. 5 is an exploded view of the angular measuring head according to a preferred mode of execution of the third embodiment of the present invention. This measuring head is constituted of a system 40 which permits collimating the light issuing from the supply fiber 39 and directing the parallel and cylindrically symmetrical beam thus obtained toward a fixed surface 41 constituted of two half-circular juxtaposed filters each respectively intercepting one of the two light waves and allowing the other to pass. The resultant beam encounters a diaphragm 42 adapted to turn about the axis A—A'. By alternately measuring the light intensities corresponding to the two wavelengths and by effecting the ratio of their difference to their sum, there is produced a linear and referenced measurement of the angular position of the diaphragm 42. Finally, an optical system 43 permits coupling the resultant light signals to the return fiber 44.

FIG. 6 describes the operation of this measuring head. It comprises outlines of the intensities $I_1$ and $I_2$ detected at the two wavelengths in question $\lambda_1$ and $\lambda_2$, as a function of the angle $\theta$ between the diaphragm and the surface composed of the two filters $F_1$, $F_2$; each filter allows one of the two light waves to pass and intercepts the other. The ratio $(I_1-I_2)/(I_1+I_2)$ is directly proportional to the angle at which the diaphragm is turned over each of the angular regions (0°-180°) and (180°-360°).

FIG. 7 is an exploded view of the angular measuring head according to a preferred mode of execution of the fourth embodiment of the present invention.

This measuring head is constituted of a system 46 which permits collimating the light issuing from the supply fiber 45 and directing the resultant parallel and cylindrically symmetrical beam toward a fixed surface 47 constituted of two juxtaposed 120° sector angle filters, each of which permits one of the three light waves to pass and intercepts the two others. The resultant beam encounters a diaphragm 48 having the shape of a 120° angular sector, adapted to turn about the axis A—A'. By alternately measuring the light intensities corresponding to the three wavelengths and by effecting the ratios of the intensities, there is produced a linear and referenced measurement of the angular position of the diaphragm 48 over each of the angular regions (0°-120°), (120°-240°) and (240°-360°).

Finally, an optical system 49 permits coupling the resultant signals to the return fiber.

Figure 8:
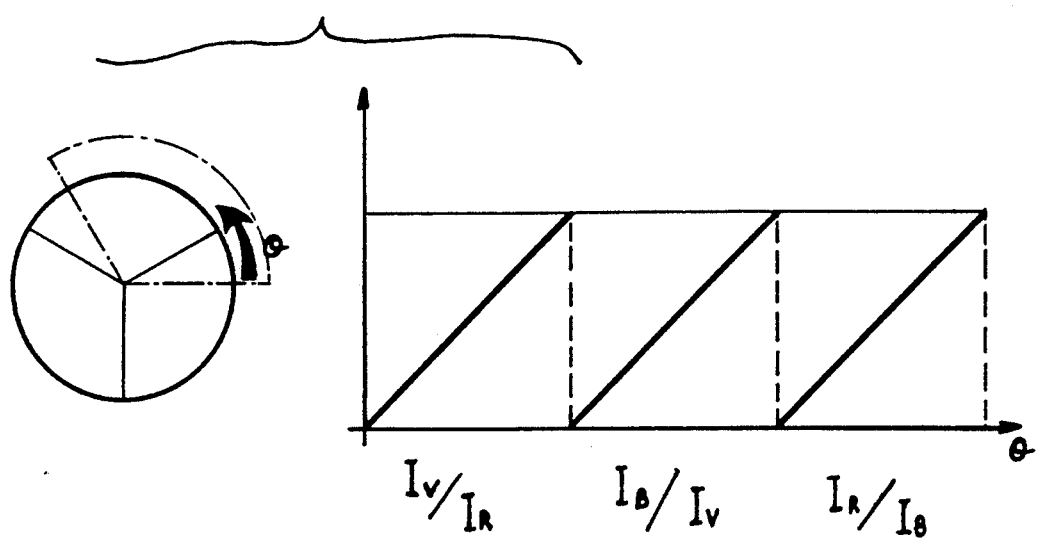
FIG. 8 describes the operation of the measuring head according to a preferred mode of execution of the fourth embodiment of the present invention. It comprises outlines of the intensities detected at the three wavelengths in question $I_V$, $I_R$ and $I_B$, as a function of the angle between the diaphragm and the surface composed of the three filters $F_V$, $F_R$ and $F_B$; each filter intercepts one of the three light waves and allows the two others to pass.

FIG. 8 describes the operation of this measuring head. It comprises outlines of the ratios of the intensities detected at the three wavelengths in question $\lambda_V$, $\lambda_R$ and $\lambda_B$. The ratios $I_V/I_R$, $I_B/I_V$ and $I_R/I_B$ permit achieving a linear measurement of the angle to which the diaphragm is turned, over the angular regions (0°-120°), (120°-240° C.) and (240°-360°) respectively.

FIG. 9 shows an optical chain for measuring angle according to the fifth embodiment of the present invention. The control cabinet 51 contains two light sources 52 and 53 of different wavelengths.

An X-shaped fiber coupler 51 permits directing the two waves emitted by the two sources 52 and 53 toward the connector 55 or toward the photodiode 56. The connector 55 permits coupling the light issuing from the two sources 52 and 53 to the supply optical fiber 57. The connector 55 may be followed, if desired, by a mixer of modes and an evacuator of non-propagating modes (not shown in FIG. 9).

The optical fiber 57 transports the light waves to the measuring head 58 which transmits the measurement signals to the control cabinet 51 via optical fibers 59 and 60. The measurement signals are detected by the photodiodes 61 and 62.

An electronic module 63 permits synchronizing the alternate emission of the two light sources 52 and 53 and the detection of the signals on the photodiodes 61 and 62.

This electronic module 63 also permits controlling the emission power of the diodes 52 and 53 at a constant level, by using signals delivered from the photodiode 56.

FIG. 10 is an exploded view of the measuring head 58 permitting a better understanding of its operation. This measuring head is constituted of a system 64 which permits collimating the light issuing from the supply fiber 57 and directing the resultant parallel and cylindrically symmetrical beam toward a diaphragm 65 having two circular openings; the first is centered on the axis A—A' and the second is off-center; they are referred to respectively as "principal" and "secondary".

Light which is passed through the principal opening encounters a fixed surface 66 constituted of two juxtaposed half-circular filters each intercepting respectively one of the two light waves and allowing the other to pass. The resultant beam encounters a diaphragm 67 adapted to turn about the axis A—A'. Finally, an optical system 68 permits coupling the resultant beam to the return fiber 59. By alternately measuring, with the aid of the photodiode 61, the light intensities corresponding to the two light waves and, by effecting the ratio of their difference to their sum, there is achieved a linear and referenced measurement of the angular position of the diaphragm 67.

Light having passed through the secondary opening of the diaphragm 65 may be intercepted or not intercepted by the turning diaphragm 67. When it is not intercepted by this diaphragm 67, it is refocussed by the optical element 69 and coupled to the second return fiber 60.

The photodiodes 61 and 62 receive the waves issuing from the "principal" and "secondary" measuring paths, respectively, and transported by the return optical fibers 59 and 60. The signal detected by the photodiode 61 permits identifying in which planar angular sector the measurement is performed: (0°-180°) or (180°-360°).

Figure 11:
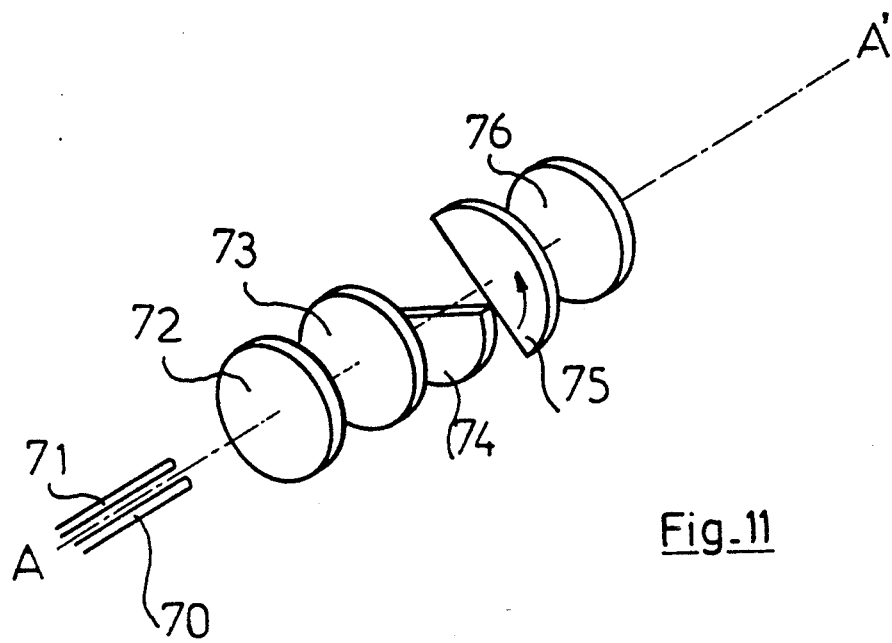
FIG. 11 is an exploded view of the angular measuring head according to a preferred mode of execution of the sixth embodiment of the present invention.

FIG. 11 is an exploded view of the angular measuring head according to a preferred mode of execution of the sixth embodiment of the present invention. This measuring head is constituted of an optical system 72 which permits collimating the light issuing from the supply optical fiber 70 and refocussing the return light on the return optical fiber 71. The extremities of the supply optical fiber 70 and return optical fiber 71 are situated in the focal plane of the optical system 72 and symmetrically with respect to the axis of symmetry A—A'. The beam issuing from the optical system 72, which is collimated and has symmetry of revolution, encounters a planar interferential filter 73 situated normal to the axis of symmetry A—A'. The wavelength $\lambda 1$ is reflected by the filter 73, and is focussed by the optical system 72 in the return optical fiber 71. The optical beam of wavelength $\lambda 2$, which is collimated and has symmetry of revolution, is transmitted by the interferential filter 73 and encounters a half-planar fixed diaphragm 74 whose edge cuts the light beam at the level of the axis A—A'. The resultant beam encounters another diaphragm 75 of the same type, adapted to turn about the axis A—A'. This turning diaphragm intercepts a fraction of the light energy transmitted by the previous diaphragm, proportional to the angle at which it is turned. The beam next encounters a planar mirror 76 situated normal to the axis A—A'. The optical beam reflected by the mirror passes back through the interferential filter 73 and is focussed in the return optical fiber 71 by the optical system 72.

Figure 12:
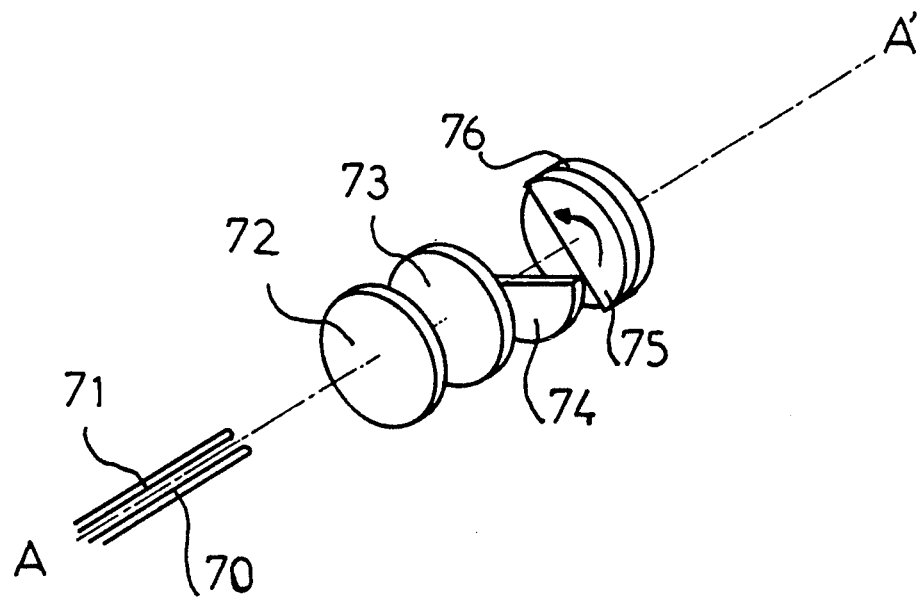
FIG. 12 is a variation of the sixth embodiment according to which the half-planar diaphragm is integrated with the planar mirror.

FIG. 12 is a variation of the sixth embodiment according to which the half-planar diaphragm 75 is integrated with the planar mirror 76; the assembly of the diaphragm 75 and the mirror 76 being adapted to turn about the axis A—A'. The operation of this embodiment is identical to that shown in FIG. 11.

The device according to any of these embodiments of the invention may be used in any application requiring a measurement of angle or position It does not comprise any electric or electronic element outside of the control cabinet, which may be maintained remote from the measuring site; it is therefore particularly useful in explosive or irradiated media, or also in the presence of strong electromagnetic disturbances. In any case, the "in line" geometry of the measuring head, that is to say the coincidence of the optical and mechanical axes, permits obtaining a significant miniaturization of the device, which is especially interesting for aeronautic and robotic applications. Finally, the device according to any of the embodiments of the invention, permits eliminating any referencing problem associated with difficult conditions of use (vibrations, temperature variations . . . ).

REFERENCES

1. Control cabinet
2. Light source
3. Light source
4. Connector
5. Connector
6. Supply optical fiber
7. Supply optical fiber
8. Fiber coupler
9. Fiber coupler
10. Measuring head
11. Coupler
12. Coupler
13. Return optical fiber
14. Return optical fiber
15. Connector
16. Connector
17. Photodiode
18. Photodiode
19. Electronic module
20. Light collimating system
21. Half-planar fixed diaphragm
22. Diaphragm
23. Beam focussing optical system
24. Control cabinet
25. Light source
26. Light source
27. Fiber coupler
28. Supply optical fiber
29. Measuring head
30. Return optical fiber
31. Photodiode
32. Electronic module
33. Light collimating system
34. Half-planar fixed diaphragm
35. Filter
36. Beam coupling optical system
37. Connector
38. Photodiode
39. Supply fiber
40. Light collimating system
41. Fixed surface
42. Diaphragm
43. Optical system coupling light signals
44. Return fiber
45. Supply fiber
46. Light collimating system
47. Fixed surface
48. Diaphragm
49. Signal coupling optical system
50. Return fiber
51. Control cabinet
52. Light source
53. Light source
54. X-shaped fiber coupler
55. Connector
56. Photodiode
57. Supply optical fiber
58. Measuring head
59. Optical fiber
60. Optical fiber
61. Photodiode
62. Photodiode
63. Electronic module
64. Light collimating system
65. Diaphragm
66. Fixed surface
67. Diaphragm
68. Beam coupling optical system
69. Optical element
70. Supply optical fiber
71. Return optical fiber
72. Light collimating optical system
73. Planar interferential filter
74. Half-planar fixed diaphragm
75. Diaphragm
76. Planar mirror.

What is claimed is:

1. Optical device for measuring angles, comprising in coaxial assembly along an axis a supply optical fiber, a return optical fiber, and a measuring head, means for directing non-coherent light through said supply optical fiber to said measuring head and then through said return optical fiber, the measuring head comprising a collimator for light arriving from said supply optical fiber, a diaphragm and an element which is either a diaphragm or a filter, one of said diaphragm and element being fixed and the other of said diaphragm and element being rotatable about said axis, and means to refocus light passing beyond said diaphragm and element into said return optical fiber.

2. Device according to claim 1, said supply and return optical fibers being disposed on opposite sides of said measuring head.

3. Device according to claim 1, said supply and return optical fibers being disposed on the same side of said measuring head and lying side-by-side, and mirror means to reverse the direction of light that has passed through said measuring head.

4. A device as claimed in claim 1, in which said element is a diaphragm.

5. A device as claimed in claim 1, in which said element is a filter.

6. A device as claimed in claim 1, in combination with two light sources of different wavelengths and two photodiodes, means for alternately directing light from each of said light sources to said supply optical fiber and to one of said photodiodes, and means for directing light from said return optical fiber to the other of said photodiodes.

7. Device according to claim 1, further comprising means for supplying light of two different wavelengths alternately to said supply fiber, a planar interferential filter completely reflecting the light of one wavelength and allowing the light of the other wavelengths to pass, said interferential filter being located on the path of the light waves after the refocussing means and being disposed perpendicular to said axis, and two diaphragms situated after the interferential filter, one of said two diaphragms being fixed and the other adapted to turn about said axis, and a planar mirror perpendicular to said axis for reflecting light of said other wavelengths.

8. Device according to claim 7, wherein the movable diaphragm is integrated as an assembly with the planar mirror and said assembly turns about said axis.

* * * * *